United States Patent
Fujita (10) Patent No.: US 11,405,707 B2
(45) Date of Patent: Aug. 2, 2022

(54) OPERATING DEVICE AND ACOUSTIC DEVICE

(71) Applicant: YAMAHA CORPORATION, Hamamatsu (JP)

(72) Inventor: Shinichi Fujita, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 798 days.

(21) Appl. No.: 16/217,458

(22) Filed: Dec. 12, 2018

(65) Prior Publication Data
US 2019/0191233 A1    Jun. 20, 2019

(30) Foreign Application Priority Data
Dec. 15, 2017   (JP) .............................. JP2017-240632

(51) Int. Cl.
| | |
|---|---|
| G05G 1/12 | (2006.01) |
| H04R 1/02 | (2006.01) |
| F16C 27/06 | (2006.01) |
| F16C 21/00 | (2006.01) |
| F16C 27/00 | (2006.01) |
| H01H 19/14 | (2006.01) |
| F16H 37/06 | (2006.01) |
| H04R 1/28 | (2006.01) |

(52) U.S. Cl.
CPC ............... *H04R 1/02* (2013.01); *F16C 21/00* (2013.01); *F16C 27/00* (2013.01); *F16C 27/066* (2013.01); *F16H 37/065* (2013.01); *G05G 1/12* (2013.01); *H01H 19/14* (2013.01); *H04R 1/2807* (2013.01); *F16C 2314/00* (2013.01)

(58) Field of Classification Search
CPC .. G05G 1/08; G05G 1/10; G05G 1/12; H01H 3/08; H01H 19/14; H01H 25/06
See application file for complete search history.

(56) References Cited

U.S. PATENT DOCUMENTS 2,823,966 A * 2/1958 Reynolds ............. F16J 15/3224
                                                      384/484
3,007,753 A * 11/1961 Potter .................... F16C 35/063
                                                      384/538

(Continued)

FOREIGN PATENT DOCUMENTS

| CN | 204270192 U | 4/2015 |
|---|---|---|
| EP | 1220068 A2 | 7/2002 |

(Continued)

OTHER PUBLICATIONS

Extended European Search Report issued in European Appln. No. 18212218.4 dated Apr. 2, 2019.

(Continued)

*Primary Examiner* — Richard W Ridley
*Assistant Examiner* — Brian J McGovern
(74) *Attorney, Agent, or Firm* — Rossi, Kimms & McDowell LLP (57) ABSTRACT

An operating device includes: an operating member operable by a user; a rotation shaft having an end portion provided with the operating member; a first bearing supporting a first portion of the rotation shaft; and a second bearing supporting a second portion of the rotation shaft. The second portion is located nearer to the operating member than the first portion in an axial direction of the rotation shaft.

14 Claims, 5 Drawing Sheets

(56) References Cited

U.S. PATENT DOCUMENTS

| | | | | |
|---|---|---|---|---|
| 4,857,677 | A | * | 8/1989 | Tanaka .................... G05G 1/10 |
| | | | | 200/5 R |
| 4,859,922 | A | * | 8/1989 | Tauchenitz ............... G05G 1/10 |
| | | | | 318/628 |
| 4,892,312 | A | | 1/1990 | Minemoto et al. |
| 8,388,232 | B2 | * | 3/2013 | Iida ....................... F16C 35/067 |
| | | | | 384/535 |
| 8,493,190 | B2 | | 7/2013 | Periquet |
| 9,127,714 | B2 | * | 9/2015 | Mola ..................... F16C 35/067 |
| 2002/0128753 | A1 | | 9/2002 | Numata et al. |
| 2011/0128135 | A1 | | 6/2011 | Periquet et al. |
| 2012/0099811 | A1 | * | 4/2012 | Ito ........................... F16C 35/04 |
| | | | | 384/448 |
| 2013/0276572 | A1 | * | 10/2013 | Vogt ......................... G05G 1/02 |
| | | | | 74/553 |
| 2015/0241903 | A1 | * | 8/2015 | Sonmez .................. G05G 1/02 |
| | | | | 74/503 |
| 2018/0080511 | A1 | * | 3/2018 | Takahashi ................ G05G 5/03 |
| 2019/0179356 | A1 | * | 6/2019 | Goto ....................... F16F 9/535 |

FOREIGN PATENT DOCUMENTS

| | | |
|---|---|---|
| FR | 2930654 A1 | 10/2009 |
| JP | S49061647 U | 5/1974 |
| JP | S59122618 U | 8/1984 |
| JP | S6065827 U | 5/1985 |
| JP | H08330108 A | 12/1996 |
| JP | 2011209876 A | 10/2011 |
| WO | 2015083334 A1 | 6/2015 |

OTHER PUBLICATIONS

Office Action issued in Chinese Appln. No. 201811530936.X dated Aug. 2, 2021. English machine translation provided.

Office Action issued in Japanese Appln. No. 2017-240632 dated Aug. 26, 2021. English machine translation provided.

Office Action issued in Japanese Appln. No. 2017-240632 dated Jun. 22, 2021. Computer generated English translation provided.

\* cited by examiner

OPERATING DEVICE AND ACOUSTIC DEVICE

CROSS REFERENCE TO RELATED APPLICATION

The present application claims priority from Japanese Patent Application No. 2017-240632, which was filed on Dec. 15, 2017, the disclosure of which is herein incorporated by reference in its entirety.

BACKGROUND

The following disclosure relates to an operating device operable by a user and to an acoustic device including the operating device.

An acoustic device such as an amplifier is provided with various kinds of operating devices for accepting operations of a user, for example. Patent Document 1 (Japanese Patent Application Publication No. 8-330108) discloses a rotary operating device operable by a user to adjust an amount (volume) of sound reproduced by an acoustic device. Specifically, an operating member in the form of an adjustment knob is provided on a distal end of a rotation shaft supported by a bearing. The user rotates the operating member to adjust the amount of the reproduced sound.

SUMMARY

In the rotary operating device, a space is required between an outer circumferential surface of the rotation shaft and an inner circumferential surface of the bearing. The space between the rotation shaft and the bearing however causes the user to recognize a rattle of the operating member in some cases. Also, there is a possibility that deformation of a component of the operating device such as the rotation shaft causes the user to recognize a wobble of the operating member. That is, it is actually difficult for the conventional rotary operating device to achieve a high-dignity and good operation feeling. Accordingly, an aspect of the disclosure relates to an operating device and an acoustic device capable of achieving a high-dignity and good operation feeling.

In one aspect of the disclosure, an operating device includes: an operating member operable by a user; a rotation shaft, the operating member being provided at an end portion of the rotation shaft; a first bearing supporting a first portion of the rotation shaft; and a second bearing supporting a second portion of the rotation shaft. The second portion is located nearer to the operating member than the first portion in an axial direction of the rotation shaft.

In another aspect of the disclosure, an acoustic device includes an operating device. The operating device includes: an operating member operable by a user; a rotation shaft, the operating member being provided at an end portion of the rotation shaft; a first bearing supporting a first portion of the rotation shaft; and a second bearing supporting a second portion of the rotation shaft. The second portion is located nearer to the operating member than the first portion in an axial direction of the rotation shaft.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
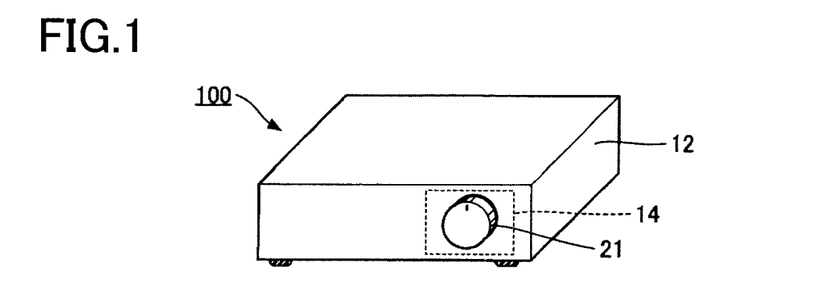
FIG. 1 is a perspective view of an acoustic device according to a first embodiment.

FIG. 1 is a perspective view of an acoustic device 100 using an operating device 14 according to a first embodiment. The acoustic device 100 is, for example, a signal processing device configured to process an acoustic signal supplied from an external device and output the processed acoustic signal to a sound emitting device such as a speaker. One example of the acoustic device 100 is an amplifier that increases the amplitude of the acoustic signal at a variable amplifying rate.

As illustrated in FIG. 1, the acoustic device 100 includes a housing 12 and the operating device 14. The housing 12 is a hollow component having a rectangular parallelepiped shape and accommodates a signal processing circuit, not illustrated, such as an amplifier circuit. The operating device 14 is provided on a front surface (i.e., a user-side surface) of the housing 12. The operating device 14 is an input device that accepts operations of the user. The operating device 14 according to the first embodiment is a rotary input device that is used for adjusting an amount (volume) of reproduced sound. That is, an amplifying rate for the acoustic signal is adjusted in response to an operation for the operating device 14.

Figure 2:
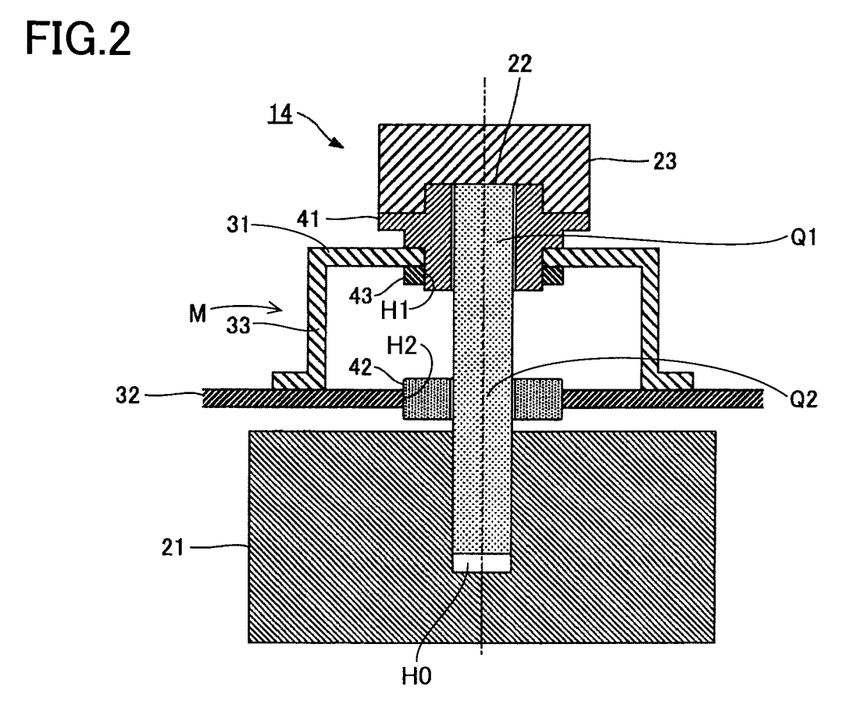
FIG. 2 is a cross-sectional view of an operating device used for an acoustic device.

FIG. 2 is a cross-sectional view of an example of the configuration of the operating device 14. As illustrated in FIG. 2, the operating device 14 according to the first embodiment includes an operating member 21, a rotation shaft 22, a changeable resistor 23 (a volume), a first supporter 31, a second supporter 32, a first bearing 41, and a second bearing 42.

The operating member 21 is a component (an operating knob) operable by the user and shaped like a circular disc or a circular cylinder. That is, the user can rotate the operating member 21 in a state in which his or her hand and/or fingers are in contact with an outer circumferential surface of the operating member 21. The rotation shaft 22 is an elongated support shaft shaped like a circular cylinder. The operating member 21 is provided at one of end portions of the rotation shaft 22, and the changeable resistor 23 is provided at the other end portion of the rotation shaft 22. Specifically, the operating member 21 and the rotation shaft 22 are secured to each other in a state in which the rotation shaft 22 is inserted in an insertion hole H0 formed in a back surface of the operating member 21.

The changeable resistor 23 is an electric component whose electrical resistance continuously changes in conjunction with rotation of the rotation shaft 22. The acoustic signal is amplified at an amplifying rate that is related to the electrical resistance of the changeable resistor 23. This configuration enables the user to adjust the amount of the reproduced sound by rotating the operating member 21 appropriately. A known rotary volume including the rotation shaft 22 and the changeable resistor 23 is used for the operating device 14.

The second supporter 32 constitutes a portion of a front surface of the housing 12 and has a planar plate shape. The operating member 21 is provided in front of the second supporter 32. In other words, the operating member 21 is disposed nearer to a front surface of the second supporter 32 (as one example of a first surface) than to a back surface of the second supporter 32 (as one example of a second surface). The second supporter 32 is formed of light metal such as aluminum, for example. The second supporter 32 extends in a direction substantially perpendicular to the axial direction of the rotation shaft 22. As illustrated in FIG. 2, a mount member M is disposed on the back surface of the second supporter 32, in other words, the mount member M is disposed on an opposite side of the second supporter 32 from the operating member 21. The mount member M is constituted by the first supporter 31 and a side wall 33 as one unit and formed of metal such as iron, for example. The first supporter 31 is a planar-plate member located on a back side of the second supporter 32 and extending in a direction substantially parallel with the second supporter 32. The side wall 33 protrudes from the first supporter 31 toward the second supporter 32. The side wall 33 extends in the axial direction of the rotation shaft 22. That is, the side wall 33 extends in a direction substantially perpendicular to the direction in which the second supporter 32 extends. For example, the side wall 33 is secured to the second supporter 32 by, e.g., an adhesive or screws. Since the side wall 33 is secured to the second supporter 32, the first supporter 31 is secured to the second supporter 32 via the side wall 33.

Thus, the first supporter 31 and the second supporter 32 are opposed to each other with a space therebetween. A first through hole H1 is formed in the first supporter 31, and a second through hole H2 is formed in the second supporter 32. The first through hole H1 and the second through hole H2 are round openings formed concentrically when viewed in the axial direction of the rotation shaft 22. That is, the first through hole H1 and the second through hole H2 overlap each other in the axial direction of the rotation shaft 22.

The first bearing 41 is secured to the first supporter 31. The first bearing 41 is an annular sliding bearing disposed in the first through hole H1 of the first supporter 31. For example, the first supporter 31 is nipped between the first bearing 41 and a nut 43, whereby the first bearing 41 is secured to the first supporter 31. The second bearing 42 is secured to the second supporter 32. The second bearing 42 is an annular sliding bearing disposed in the second through hole H2 of the second supporter 32. The inside diameter of each of the first bearing 41 and the second bearing 42 is slightly greater than the outside diameter of the rotation shaft 22.

In the configuration described above, the rotation shaft 22 is rotatably supported by the first bearing 41 and the second bearing 42 in a state in which the rotation shaft 22 is inserted in the first bearing 41 and the second bearing 42. Specifically, as illustrated in FIG. 2, a first portion Q1 of the rotation shaft 22 is supported by the first bearing 41, and a second portion Q2 of the rotation shaft 22 is supported by the second bearing 42. The second portion Q2 is located apart from the first portion Q1 in the axial direction, specifically, the second portion Q2 is located in front of the first portion Q1. In other words, the second bearing 42 supports the second portion Q2 located nearer to the operating member 21 than the first portion Q1 in the axial direction of the rotation shaft 22. That is, the rotation shaft 22 is supported at two different positions in the axial direction.

In the first embodiment as described above, the rotation shaft 22 is supported at the first portion Q1 and the second portion Q2 different in position in the axial direction. This configuration reduces a rattle or a wobble of the operating member 21 when compared with a configuration in which the rotation shaft 22 is supported at a single portion (noted that this configuration will be hereinafter referred to as "comparative example"). This achieves a high-dignity and good operation feeling. The first supporter 31 to which the first bearing 41 is secured, and the second supporter 32 to which the second bearing 42 is secured are opposed to each other, with a space therebetween. This reduces the weight of the operating device 14 and secures enough distance between the first portion Q1 and the second portion Q2 of the rotation shaft 22.

Figure 3:
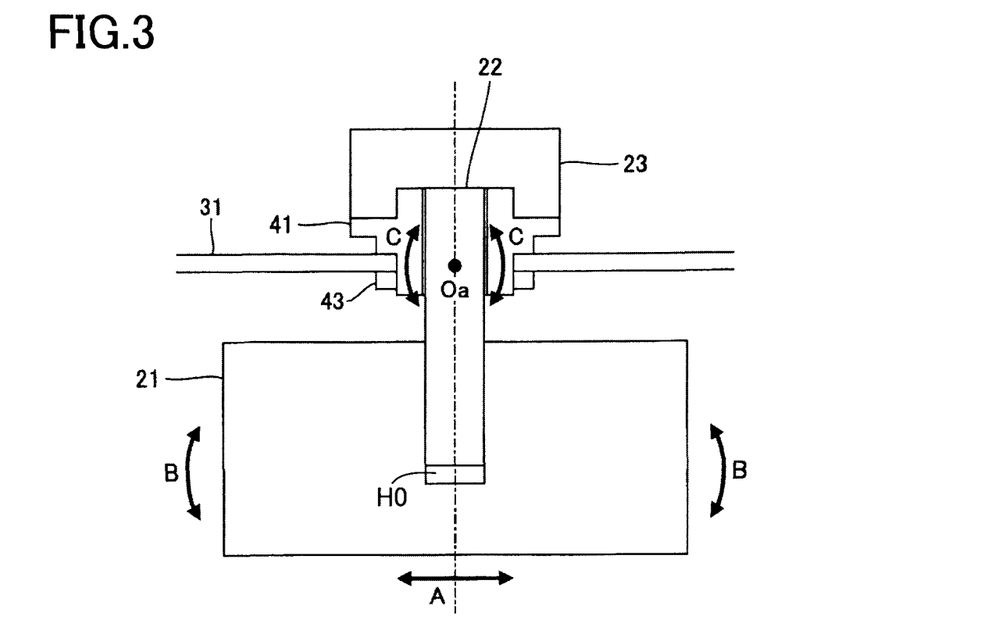
FIG. 3 is a view for explaining forces acting on components of an operating device in a comparative example.

FIG. 3 is a view for explaining forces acting on components in the comparative example. It is noted that FIGS. 3 and 4 omit hatching on the components in order to focus on the directions of the forces. In the comparative example, as illustrated in FIG. 3, the second bearing 42 in the first embodiment is omitted, and the rotation shaft 22 is supported only by the first bearing 41.

In the comparative example, when the operating member 21 is operated by the user, forces in the direction A and the direction B act on the operating member 21. The direction A is a direction perpendicular to the rotation shaft 22, and the direction B is a circumferential direction centered about the direction perpendicular to the rotation shaft 22. When the forces in the direction A or the direction B act on the operating member 21, forces in the directions C curved about a fulcrum Oa located near the first bearing 41 are applied from the rotation shaft 22 to the first bearing 41. In the comparative example, since the first bearing 41 is sufficiently near the fulcrum Oa, the strong forces in the directions C are applied from the rotation shaft 22 to the first bearing 41 by leverage.

Figure 4:
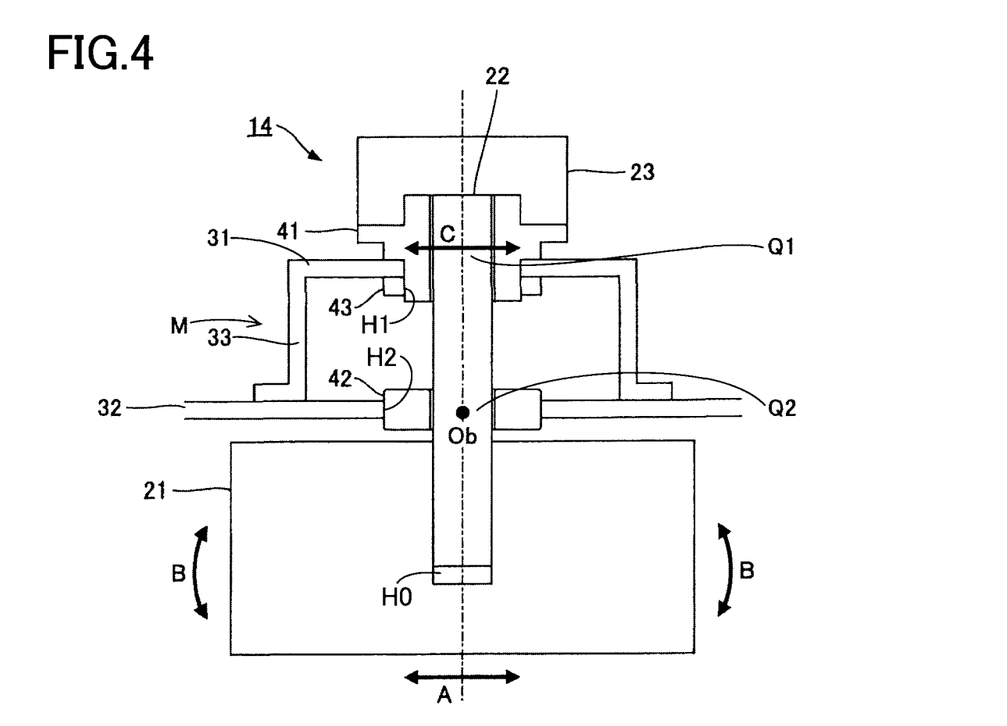
FIG. 4 is a view for explaining forces acting on components of the operating device according to the first embodiment.

FIG. 4 is a view for explaining forces acting on the components of the operating device 14 in the first embodiment. In the first embodiment, when a force in the direction A or the direction B acts on the operating member 21, a force in the direction C curved about a position Ob located near the second bearing 42 is applied from the rotation shaft 22 to the first bearing 41. In the first embodiment, as understood from FIG. 4, since the first bearing 41 is sufficiently apart from the position Oa, a force applied from the rotation shaft 22 to the first bearing 41 is less than that in the comparative example. Accordingly, the operating device 14 in the first embodiment reduces breakage of the first bearing 41 due to an external force.

There will be described a relationship between the stiffness of the first supporter 31 and the stiffness of the second supporter 32. In the first embodiment, the stiffness of the first supporter 31 is less than that of the second supporter 32. Specifically, the first supporter 31 is less than the second supporter 32 in stiffness in the direction orthogonal to the axial direction of the rotation shaft 22 (i.e., a direction in plane parallel with the first supporter 31 and the second supporter 32). That is, the first supporter 31 is more easily deformed than the second supporter 32. For example, the first supporter 31 and the second supporter 32 are respectively formed of materials different in stiffness from each other. In the configuration described above, the first supporter 31 is deformed, for example, in a deflection (camming) direction, thereby absorbing effects caused by an error in dimension of the rotation shaft 22 or deformation of the rotation shaft 22.

Second Embodiment

There will be next described a second embodiment. It is noted that the same reference numerals as used in the first embodiment are used to designate the corresponding elements of the second embodiment, and an explanation of which is dispensed with.

Figure 5:
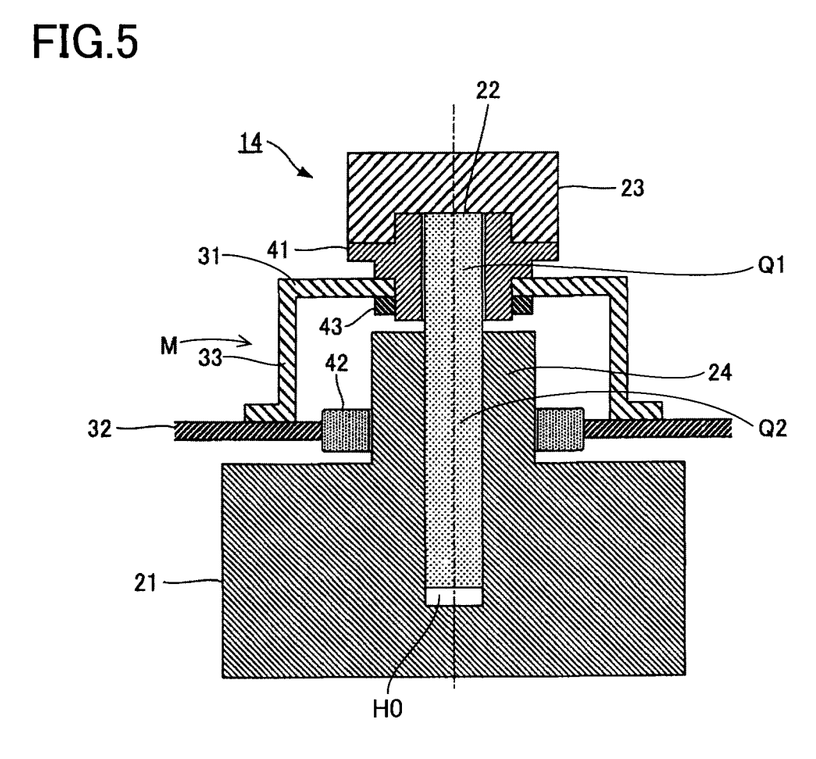
FIG. 5 is a cross-sectional view of an operating device according to a second embodiment.

FIG. 5 is a cross-sectional view of an operating device 14 according to the second embodiment. As illustrated in FIG. 5, the operating device 14 according to the second embodiment includes a cylindrical member 24 in addition to the elements of the operating device 14 according to the first embodiment. The cylindrical member 24 surrounds the rotation shaft 22 and protrudes from the operating member 21 toward the first bearing 41, i.e., toward a back side of the second supporter 32. An inner space of the cylindrical member 24 communicates with the insertion hole H0 formed in the operating member 21. It is noted that FIG. 5 illustrates the operating member 21 and the cylindrical member 24 are formed as one unit, but the cylindrical member 24 formed independently of the operating member 21 may be secured to the operating member 21.

The rotation shaft 22 is secured to the cylindrical member 24 and the operating member 21 in a state in which the rotation shaft 22 is inserted in the inner space of the cylindrical member 24 and the insertion hole H0 of the operating member 21. That is, the second portion Q2 of the rotation shaft 22 is covered with the cylindrical member 24 in the circumferential direction. Thus, the cylindrical member 24 surrounds the rotation shaft 22. Also in the present embodiment, the second portion Q2 is located apart from the first portion Q1 in the axial direction of the rotation shaft 22, and the second bearing 42 supports the second portion Q2 that is nearer to the operating member 21 than the first portion Q1 in the axial direction. That is, the rotation shaft is supported at its different portions in the axial direction.

In the second embodiment, the inside diameter of the second bearing 42 is slightly greater than the outside diameter of the cylindrical member 24. As illustrated in FIG. 5, the rotation shaft 22 is inserted in the second bearing 42 with the cylindrical member 24. That is, an inner circumferential surface (a bearing surface) of the second bearing 42 faces an outer circumferential surface of the cylindrical member 24. In other words, the cylindrical member 24 is interposed between an outer circumferential surface of the rotation shaft 22 and the inner circumferential surface of the second bearing 42. In the configuration described above, the second bearing 42 in the second embodiment indirectly supports the second portion Q2 of the rotation shaft 22, with the cylindrical member 24 interposed therebetween.

The second embodiment achieves the same effects as achieved by the first embodiment. In the second embodiment, the rotation shaft 22 is surrounded with the cylindrical member 24, and the outer circumferential surface of the cylindrical member 24 is supported by the second bearing 42, whereby the mechanical strength of the rotation shaft 22 is increased by the cylindrical member 24. This reduces deformation of the rotation shaft 22 when compared with the configuration in which the cylindrical member 24 is not formed.

Third Embodiment

Figure 6:
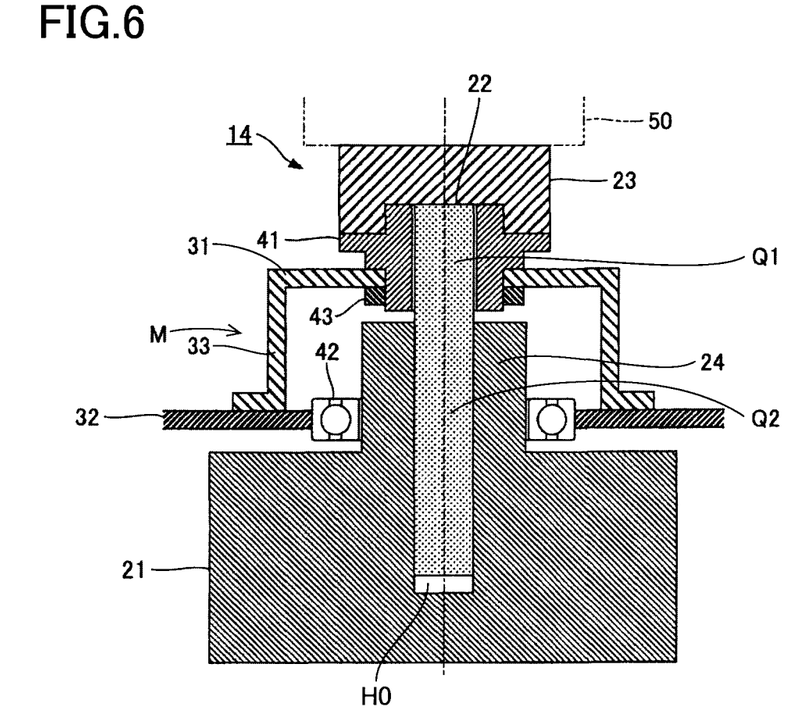
FIG. 6 is a cross-sectional view of an operating device according to a third embodiment.

FIG. 6 is a cross-sectional view of an operating device 14 according to a third embodiment. As illustrated in FIG. 6, a ball bearing is used as the second bearing 42 in the third embodiment. With this configuration, even though the rotation shaft 22 is supported at its two portions (i.e., the first portion Q1 and the second portion Q2), it is possible to effectively reduce the rotation resistance of the rotation shaft 22.

As one example, FIG. 6 illustrates a configuration (a motor-driven volume) in which the rotation shaft 22 of the operating device 14 is rotated by a drive mechanism 50 such as a motor. With the third embodiment in which the ball bearing is employed as the second bearing 42, the rotation resistance of the rotation shaft 22 is reduced to reduce torque required for the drive mechanism 50 to rotate the rotation shaft 22. Accordingly, the third embodiment is preferable for a configuration in which the rotation shaft 22 is rotated by the drive mechanism 50.

While FIG. 6 illustrates the configuration including the cylindrical member 24, the cylindrical member 24 may be omitted in the third embodiment. A ball bearing may be used as the first bearing 41.

Fourth Embodiment

Figure 7:
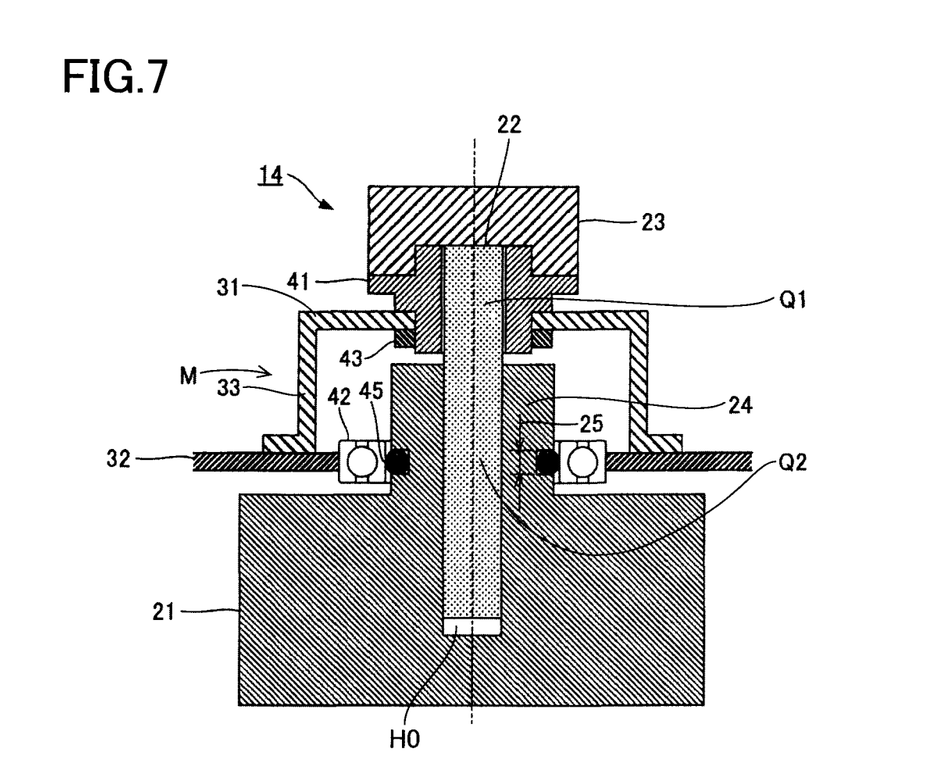
FIG. 7 is a cross-sectional view of an operating device according to a fourth embodiment.

FIG. 7 is a cross-sectional view of an operating device 14 according to a fourth embodiment. As illustrated in FIG. 7, the operating device 14 according to the fourth embodiment includes an elastic member 45 in addition to the elements of the operating device 14 according to the third embodiment. The elastic member 45 is an annular member (e.g., an O ring) formed of an elastic material and disposed between the rotation shaft 22 and the inner circumferential surface of the second bearing 42. Specifically, a groove 25 extending in the circumferential direction is formed in the outer circumferential surface of the cylindrical member 24, and the elastic member 45 is engaged with the groove 25. As illustrated in FIG. 7, the elastic member 45 is interposed between the second bearing 42 and the cylindrical member 24 in a state in which the elastic member 45 is elastically deformed by the second bearing 42 and the cylindrical member 24.

The fourth embodiment achieves the same effects as achieved by the first embodiment. In the fourth embodiment, the annular elastic member 45 is disposed between the rotation shaft 22 and the inner circumferential surface of the second bearing 42, making it difficult for the user to recognize a rattle of the operating member 21. While FIG. 7 illustrates a configuration in which a ball bearing is used for the second bearing 42, a sliding bearing may be used for the second bearing 42. The cylindrical member 24 may be omitted in the fourth embodiment. That is, the annular elastic member 45 is disposed between the second bearing 42 and the rotation shaft 22 so as to be in contact with the inner circumferential surface of the second bearing 42 and the outer circumferential surface of the rotation shaft 22. Regardless of the presence or absence of the cylindrical member 24, the annular elastic member 45 is preferably disposed between the rotation shaft 22 and the inner circumferential surface of the second bearing 42.

Modifications

There will be described modifications of the above-described embodiments. Two or more of the following modifications may be combined as needed without contradiction.

The operating member 21 and the rotation shaft 22 are formed independently of each other in each of the above-described embodiments but may be formed as one unit. In the second embodiment, the operating member 21, the rotation shaft 22, and the cylindrical member 24 may be formed as one unit.

The first supporter 31 (the mount member M) and the second supporter 32 are formed independently of each other and coupled to each other in each of the above-described embodiments but may be formed as one unit. The first bearing 41 (the sliding bearing) and the first supporter 31 may be formed as one unit, and the second bearing 42 (the sliding bearing) and the second supporter 32 may be formed as one unit.

While the operating device 14 according to each of the above-described embodiments adjusts the amount of the reproduced sound, a purpose of use of the operating device 14 is not limited to adjustment of the amount of the reproduced sound. For example, the operating device 14 according to each of the above-described embodiments may be used to adjust various parameters for the acoustic device 100. While the operating device 14 is used for the acoustic device 100 in each of the above-described embodiments, a device for which the operating device 14 is used is not limited to the acoustic device 100. The operating device 14 according to each of the above-described embodiments may be used for any known device configured to accept operations of the user.

The following configurations are achieved by the embodiments described above, for example.

According to a first form, an operating device includes: an operating member operable by a user; a rotation shaft, the operating member being provided at an end portion of the rotation shaft; a first bearing supporting a first portion of the rotation shaft; and a second bearing supporting a second portion of the rotation shaft, the second portion being located nearer to the operating member than the first portion in an axial direction of the rotation shaft. In this form, the rotation shaft is supported at the first portion and the second portion different in position in the axial direction. This configuration reduces a rattle or a wobble of the operating member when compared with a configuration in which the rotation shaft is supported by a single bearing. This achieves a high-dignity and good operation feeling.

According to a second form that is an aspect of the first form, the operating device further includes: a first supporter to which the first bearing is secured; and a second supporter opposed to the first supporter with a space therebetween. The second bearing is secured to the second supporter. In this form, the first supporter to which the first bearing is secured and the second supporter to which the second bearing is secured are opposed to each other, with a space therebetween. This reduces the weight of the operating device and secures enough distance between the first portion and the second portion of the rotation shaft.

According to a third form that is an aspect of the second form, the first supporter is less in stiffness than the second supporter. In this form, the first supporter is deformed in, e.g., a deflection direction, thereby absorbing an error in dimension of the rotation shaft and/or deformation of the rotation shaft.

According to a fourth form that is an aspect of the second or third form, the first supporter is secured to the second supporter via a side wall.

According to a fifth form that is an aspect of the fourth form, the side wall extends along the axial direction.

According to a sixth form that is an aspect of the fourth or fifth form, the second supporter has a flat-plate shape and includes a first surface and a second surface. The operating member is disposed nearer to the first surface than to the second surface of the second supporter. The first supporter is disposed nearer to the second surface than to the first surface of the second supporter and extends in a direction substantially parallel with the second supporter. The side wall is disposed nearer to the second surface than to the first surface of the second supporter and extends in a direction substantially perpendicular to the second supporter.

According to a seventh form that is an aspect of the sixth form, a mount member including the side wall and the first supporter formed as one unit is secured to the second surface of the second supporter.

According to an eighth form that is an aspect of any one of the first to seventh forms, the operating device further includes a cylindrical member protruding from the operating member toward the first bearing and surrounding the rotation shaft. An inner circumferential surface of the second bearing is opposed to an outer circumferential surface of the cylindrical member. In this form, the outer circumferential surface of the cylindrical member surrounding the rotation shaft is supported by the second bearing, whereby the mechanical strength of the rotation shaft is increased by the cylindrical member.

According to a ninth form that is an aspect of the eighth form, the second bearing supports the second portion of the rotation shaft, with the cylindrical member interposed therebetween.

According to a tenth form that is an aspect of any one of the first to ninth forms, the second bearing is a ball bearing. In this form, even though the rotation shaft is supported by the first bearing and the second bearing, it is possible to effectively reduce the rotation resistance of the rotation shaft.

According to an eleventh form that is an aspect of any one of the first to tenth forms, the operating device includes an annular elastic member disposed between the rotation shaft and an inner circumferential surface of the second bearing. In this form, the annular elastic member is disposed between the rotation shaft and the inner circumferential surface of the second bearing, making it difficult for the user to recognize a rattle of the operating member.

According to a twelfth form that is an aspect of any one of the first to eleventh forms, The operating device further includes a drive mechanism configured to rotate the rotation shaft.

According to a thirteenth form, an acoustic device includes an operating device. The operating device includes: an operating member operable by a user; a rotation shaft, the operating member being provided at an end portion of the rotation shaft; a first bearing supporting a first portion of the rotation shaft; and a second bearing supporting a second portion of the rotation shaft, the second portion being located nearer to the operating member than the first portion in an axial direction of the rotation shaft.

According to a fourteenth form that is an aspect of the thirteenth form, the acoustic device further includes an adjusting mechanism configured to adjust a parameter of an acoustic signal in conjunction with rotation of the rotation shaft.

According to a fifteenth form that is an aspect of the thirteenth or fourteenth form, the acoustic device further includes a front panel. The second bearing is secured to the front panel.

What is claimed is:
1. An operating device comprising:
 an operating member;
 a rotation shaft, the operating member being provided at an end portion of the rotation shaft;

a first bearing supporting a first portion of the rotation shaft;

a second bearing supporting a second portion of the rotation shaft, the second portion being located nearer to the operating member than the first portion in an axial direction of the rotation shaft;

a first supporter to which the first bearing is secured; and a second supporter opposed to the first supporter with a space therebetween, wherein the second bearing is secured to the second supporter, and wherein the first supporter is less in stiffness than the second supporter.

2. The operating device according to claim 1, wherein the first supporter is secured to the second supporter via a side wall.

3. The operating device according to claim 2, wherein the side wall extends along the axial direction.

4. The operating device according to claim 2, wherein:

the second supporter has a flat-plate shape and comprises a first surface and a second surface, the operating member is disposed nearer to the first surface than to the second surface of the second supporter, the first supporter is disposed nearer to the second surface than to the first surface of the second supporter and extends in a direction substantially parallel with the second supporter, and the side wall is disposed nearer to the second surface than to the first surface of the second supporter and extends in a direction substantially perpendicular to the second supporter.

5. The operating device according to claim 4, wherein a mount member comprising the side wall and the first supporter formed as one unit is secured to the second surface of the second supporter.

6. The operating device according to claim 1, further comprising:

a cylindrical member protruding from the operating member toward the first bearing and surrounding the rotation shaft, wherein an inner circumferential surface of the second bearing is opposed to an outer circumferential surface of the cylindrical member.

7. The operating device according to claim 6, wherein the second bearing supports the second portion of the rotation shaft, with the cylindrical member interposed therebetween.

8. The operating device according to claim 1, wherein the second bearing is a ball bearing.

9. The operating device according to claim 1, further comprising an annular elastic member disposed between the rotation shaft and an inner circumferential surface of the second bearing.

10. The operating device according to claim 1, further comprising a drive mechanism configured to rotate the rotation shaft.

11. The operating device according to claim 1, wherein the operating member includes an outer circumferential surface configured to be touched by a user of the operating device.

12. An acoustic device comprising:

a housing; and an operating device comprising:

an operating member operable by a user;

a rotation shaft, the operating member being provided at an end portion of the rotation shaft;

a first bearing supporting a first portion of the rotation shaft;

a second bearing supporting a second portion of the rotation shaft, the second portion being located nearer to the operating member than the first portion in an axial direction of the rotation shaft;

a first supporter to which the first bearing is secured; and a second supporter opposed to the first supporter with a space therebetween, wherein the second bearing is secured to the second supporter, and wherein the first supporter is less in stiffness than the second supporter.

13. The acoustic device according to claim 12, further comprising an adjusting mechanism configured to adjust a parameter of an acoustic signal in conjunction with rotation of the rotation shaft.

14. The acoustic device according to claim 12, further comprising:

a front panel, wherein the second bearing is secured to the front panel.

* * * * *